United States Patent [19]
Reed et al.

[11] Patent Number: 5,319,635
[45] Date of Patent: * Jun. 7, 1994

[54] ELECTRONIC DUPLEX COMMUNICATION SYSTEM

[75] Inventors: John D. Reed, Arlington; Walter J. Rozanski, Jr., Hurst; Charles N. Lynk, Jr., Bedford, all of Tex.

[73] Assignee: Motorola, Inc., Schaumburg, Ill.

[*] Notice: The portion of the term of this patent subsequent to Feb. 25, 2009 has been disclaimed.

[21] Appl. No.: 987,032

[22] Filed: Dec. 7, 1992

Related U.S. Application Data

[63] Continuation-in-part of Ser. No. 696,394, May 6, 1991, abandoned.

[51] Int. Cl.$^5$ .............................................. H04L 5/16
[52] U.S. Cl. ...................................... 370/31; 455/35.1
[58] Field of Search ................ 370/24, 101, 25, 26, 370/27, 28, 29, 30, 31, 32, 109, 95.1, 110.1; 379/57, 58, 62, 56; 455/35.1, 11.1, 73, 166.1, 166.2, 113, 76

[56] References Cited

U.S. PATENT DOCUMENTS

| | | | |
|---|---|---|---|
| 4,056,779 | 11/1977 | Toler | 255/58.1 |
| 4,501,017 | 2/1985 | Higgins | 455/78 |
| 4,672,601 | 6/1987 | Ablay | 370/31 |
| 4,742,514 | 5/1988 | Goode et al. | 370/29 |
| 4,776,037 | 10/1988 | Rozanski, Jr. | 455/166.2 |
| 4,873,520 | 10/1989 | Fisch | 379/88 |
| 4,967,407 | 10/1990 | Lynk | 370/50 |
| 5,060,296 | 10/1991 | Grube et al. | 455/35.1 |
| 5,091,906 | 2/1992 | Reed et al. | 370/94.1 |
| 5,095,540 | 3/1992 | Reed | 455/73 |

Primary Examiner—Douglas W. Olms
Assistant Examiner—Huy D. Vu
Attorney, Agent, or Firm—Robert S. Babayi; Pedro P. Hernandez

[57] ABSTRACT

A communication unit (10) transmits a first signal (12) that has a plurality of holes (44) therein during the occurrence of which another communication unit may interrupt. A repeater (14) receives the first signal and transmits a second signal (16) comprising the information in the first signal, and a plurality of digital coded squelch words synchronized with the holes to indicate the location of at least one of the holes in the first signal (i.e., the time at which at least one of the holes will occur). In one embodiment, each hole occurs after each pair of coded squelch words, and accordingly the pairs of coded squelch words are marked to indicate the times of occurrence of holes in the first signal.

12 Claims, 3 Drawing Sheets

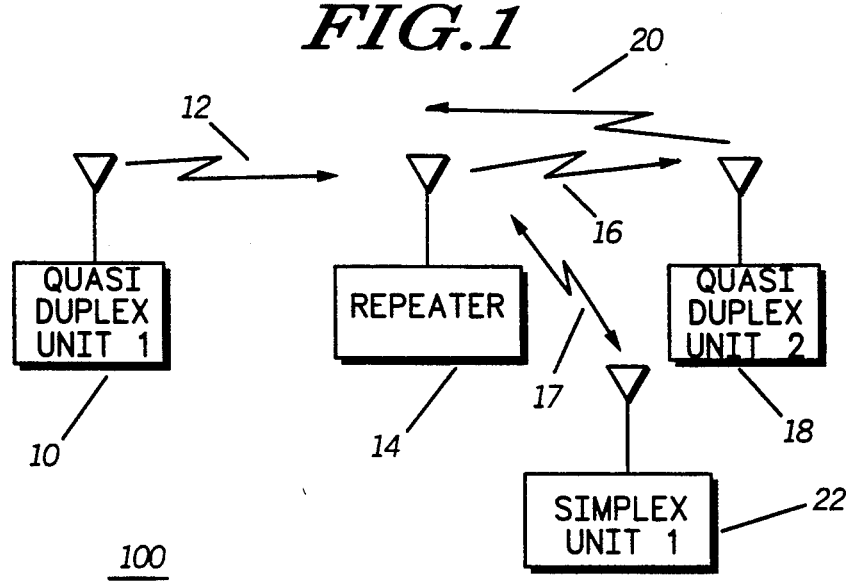
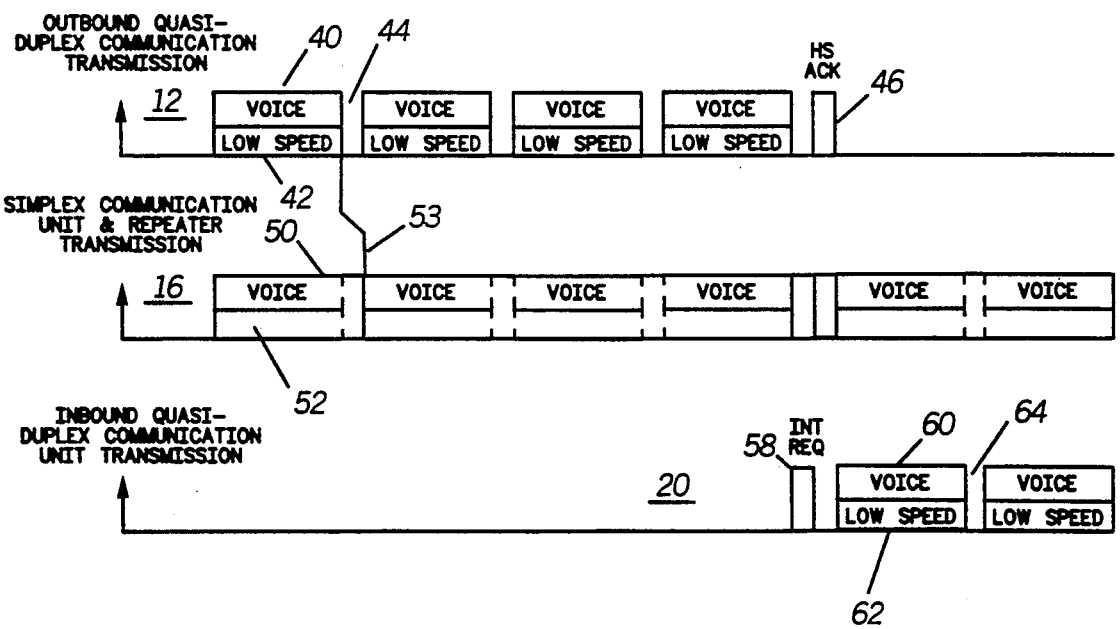

ELECTRONIC DUPLEX COMMUNICATION SYSTEM

CROSS REFERENCE TO RELATED APPLICATIONS

This is a continuation-in-part of application Ser. No. 696,394, filed May 6, 1991, by Reed, et al., entitled Electronic Duplex Communication System, assigned to Motorola, Inc. and now abandoned.

TECHNICAL FIELD

This invention relates generally to electronic communications systems and more particularly to electronic communications systems using sub-audible digital-coded squelch.

BACKGROUND

Electronic quasi-duplex communication units use holes in their transmissions to allow other radios receiving those transmissions to interrupt the transmissions, thus obtaining quasi-duplex communication. The interrupting communication unit must send a (high speed data) request packet at the proper time (i.e., when the other radio is "listening"). Therefore, electronic duplex radio communication systems require transmission of synchronization or timing signals informing the receiving radios the location of those holes to enable them to interrupt at the proper time. This is done with low-speed signaling. Moreover, it is desirable for electronic duplex radios to be compatible with existing simplex communication systems. The simplex communication systems include a plurality of simplex communication units with sequential, as opposed to simultaneous, talk and listen capability. In simplex systems, the communication units are generally grouped with each other such that communications directed at one group is not heard by others in different groups. Such selective communication capability is achieved by sub-audible coded squelch signals. Such coded squelch signals could comprise analog sub-audible tone coded squelch signals or digital coded squelch signals.

Quasi-duplex communication units may not operate in a simplex communication system because such system does not provide hole timing information to enable the communication units perform their interruption routines for establishing a quasi-duplex communication. On the other hand, the quasi-duplex communication systems do not provide the coded squelch capability needed for selective communication among the simplex communication units. It is, therefore, desired to provide communication capability among quasi-duplex communication units and the simplex communication units in an integrated communication system.

SUMMARY OF THE INVENTION

Briefly, according to the invention, a communication system is provided having a plurality of quasi-duplex communication units 10 and 18 and at least one simplex communication unit 22. The quasi-duplex communication unit 10 transmits a first signal that has a plurality of holes therein (i.e., gaps in the transmission). The quasi-duplex communication unit 18 may interrupt transmission of the first communication unit during the occurrence of any of these holes. A repeater 14 receives a first signal 12 from the communication unit 10 and retransmits a second signal comprising a plurality of coded squelch signals which are synchronized to the location of the holes in the first signal 12 to provide the hole timing information of the first signal (i.e., the time at which at least one of the holes will occur). The coded squelch signal transmitted by the repeater 14 in addition to providing hole timing information to the quasi-duplex communication unit 18 is also capable of unsquelching at least one of the simplex communication units.

BRIEF DESCRIPTION OF THE DRAWINGS

FIG. 1 is a block diagram of a communication system in which the invention may be used.

FIG. 2 shows a series of transmissions in accordance with the invention.

DETAILED DESCRIPTION OF THE PREFERRED EMBODIMENTS

Figure 3:
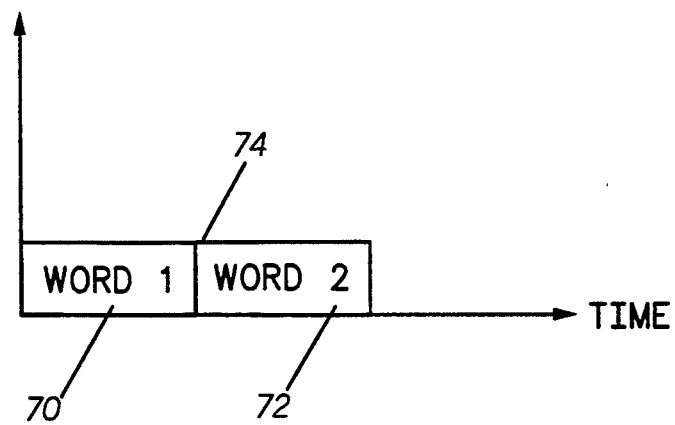
FIG. 3 shows a pair of coded squelch words marked in accordance with the invention.

Referring to FIG. 1, a block diagram of a communication system 100 is shown. The communication system 100 provides communication capability between a plurality quasi-duplex communication units comprising first and second communication units 10 and 18 and at least one simplex communication unit 22. The communication units 10, 18 and 22 are microprocessor controlled having a controller which is appropriately programmed to perform the operational features specific to each communication unit. The communication system 100 comprises a quasi-duplex communication system with bi-directional hole extension as described in the U.S. Pat. No. 5,091,906 which is issued to the applicants of the present invention and is incorporated herein by reference. The communication system 100 is capable of providing quasi-duplex communication between the first and the second quasi-duplex communication units 10 and 18 according to principals disclosed in the above referenced patent. The present invention further improves the communication system 100 by providing communication capability between the quasi-duplex communication units 10 and 18 and the simplex communication unit 22.

Operationally, the first quasi-duplex communication unit 10 transmits a signal 12 having a plurality interrupt holes (from which audio and the RF signal have been removed) therein. The holes allow other communication units, such as the second communication unit 18 to interrupt the transmissions of the first communication unit 10, thus achieving quasi-duplex operation. A microprocessor controlled repeater 14, having signal processing means, receives the transmission signal 12, and reconstructs the portion of the audio removed from the hole (i.e., hole fill) ands transmits a second signal 16 to the communication units 18 and 22. Alternatively, the signal 12 could be compressed in the transmitter of the first communication unit 10 to fit between the holes in the transmission 12. The repeater 14 upon reception of signal 12 expands the audio prior to repeating it by means of a second signal to the second communication unit 18 and the simplex communication unit 22. In this way, because of hole filling processing of the repeater 14, the signal 16 is free from holes.

In some communication systems, a coded squelch word, such as Motorola's DIGITAL PRIVATE LINE (DPL) coded squelch word, is used wherein a communication unit originating a call continuously transmits a digital coded signal which is decoded by a corresponding decoder in a remote receiver to unsquelch the audio path if a predetermined code is detected. The simplex communication unit 22 is responsive to a predetermined DPL code for unsquelching its audio path, thereby allowing only those communication units which are grouped with the simplex communication unit 22 and have matching DPL code to communicate with the simplex communication unit 22. Other radios communicating on the same RF channel, but not sensitive to the same coded squelch signal, remain unsquelched. Because the coded squelch is at the low frequency end of the received signal, and is filtered out of the audio, it is referred to as sub audible and is not heard by the user of the radio. Motorola's DIGITAL PRIVATE LINE coded squelch (DPL) has a predetermined time interval of approximately 184 ms and uses a 23 bit binary code word which is generated by an encoder in a transmitting communication unit.

Referring to FIG. 2, the transmission signal 12, transmitted by the first quasi-duplex communication unit 10, includes a voice portion 40, a low-speed data portion 42, and a plurality of holes 44. The low-speed data portion 42 can be of any arrangement because only the repeater 14 receives it. The primary purpose of the low-speed data portion 42 is to tell the repeater 14 when to expect the upcoming interrupt hole 44. The transmission signal 12 may also include a high-speed acknowledgment potion 46, acknowledging receipt of an interrupt request (when appropriate). The repeater transmission 16 includes a voice-modulated portion 50, representing the voice portion 40 of the signal 12. The repeater transmission 16 also includes a coded squelch signal comprising a data portion 52.

According to the invention, a coded squelch signal incorporated within the communication signal 16 is transmitted by the repeater 14 which in addition to providing hole timing information to the quasi-duplex communication units 18 is also capable of unsquelching the simplex unit 10 as it operates within the communication system 100. In the preferred embodiment of the present invention the coded squelch signal comprises a pair of DPL words which are used for hole timing purposes as well as for unsquelching of the simplex communication unit 18. As such, the data portion 52 includes a plurality of coded squelch words synchronized with the plurality of interrupt holes in the transmission 12 to indicate to other quasi-duplex communication units, such as communication unit 18, when interruption of the transmission 12 is possible. In one embodiment, the data portion 52 includes a plurality of DPL words paired together in some fashion to also unsquelch simplex communication unit 22. Thus, the repeater 14 receives the input low speed data 42, and reconstructs, within the signal 16, DPL coded squelch word pairs 52 which provide hole timing information to the quasi-duplex communication unit 18 and also provide for unsquelching the simplex communication unit 22. To achieve this, the transmission of the signal 16 is delayed for a period as indicated by line 53 to allow the repeater time to fill-in the holes 44. As a result, the second communication unit 18 may interrupt the transmission 12 by transmitting an interrupt request 58 (i.e., a high-speed data packet) during the occurrence of a hole 44. Since the repeater 14 is fully duplex, it receives the interrupt request 58, without requiring holes in its transmission. Upon receiving the acknowledgment 46 from the first communication unit 10, the second communication unit 18 may begin a transmission 20 similar to that of communication unit 10. The transmission 20 includes a voice portion 60 and a low-speed data portion 62 similar to those in signal 16.

The simplex radio does not have interruption capability. However, a transmission signal 17 from the simplex unit 22 have identical arrangement to that of the transmission signal 16. Upon reception of the transmission signal 17, the repeater 14 re-transmits it to the other communication units within the communication system 100 without any modification. In order to properly process received signals, the repeater 14 has to distinguish between the transmission, transmission signal 12 and the transmission signal 17, i.e., from the quasi-duplex communication units 10 and 18 and transmissions from the simplex communication unit 22. The repeater 14 distinguishes between the transmissions 12 and 17 by decoding and distinguishing between the low-speed data 42 and the coded squelch signal 52. If the repeater detects a low speed data transmission, the hole filing steps described above are performed on the received signal. However, if a coded squelch signal is detected the received signal is re-transmitted without further processing.

In this embodiment of the invention, two DPL digital coded squelch words 52 are transmitted for every hole 44. In other words, a new hole 44 occurs for every two coded squelch words 52. Since the holes are spaced out in time, one hole time is associated with two coded squelch words, thus the coded squelch words must be identified as coded squelch word pairs 52. Depending on the application the DPL words may be identical or they may be different form each other. Utilizing identical DPL words facilitates detection by providing substantially longer detection period.

Summarizing the communication system 100 operation, the first communication unit 10 transmits the first signal 12 which among other things includes the low speed data 42. Upon reception, the first signal 12 is processed by the repeater 14 to create the second signal 16 including coded squelch word pairs 52 which is transmitted to the simplex unit 22 and the second quasi-duplex communication unit 18. The DPL pair 52 is coded to unsquelch the simplex radio 22 and also to provide hole timing information to the second quasi-duplex communication unit 18. Thus, the second signal 16 when received by the simplex communication unit 22 unsquelches its audio path to enable radio user to receive the communicated message. Also, when the second signal 16 is received by the second communication unit 18, the DPL pair 52 allows it to determine the hole timing for interrupting the first communication unit 10 for carrying on the quasi-duplex communication. Thus, the DPL feature, present in many existing simplex communication units, is used to provide the synchronization required for quasi-duplex communication as well as providing for unsquelching of the simplex communication unit 22. Accordingly, the incorporation of the DPL squelch codes in the communication protocol of the communication system 100 allows the quasi-duplex communication units to communicate with both quasi-duplex communication units as well as simplex communication units.

Referring to FIG. 3, there is shown a pair of DPL coded squelch words 70 and 72 which are included in the data portion 52 of the transmission 16. The two DPL words are paired by, for example, providing a marker 74 between the DPL words, or at the beginning, end, or other predetermined location within the pair of DPL words. Although many arrangements for DPL word incorporation are available, the applicants contemplate two methods for identifying the DPL words as pairs. One method for identifying the DPL words as pairs is to place the DPL word 70 immediately next to the DPL word 72. The signal processing for providing immediately adjacent DPL words within the communication message 20 is achieved in the repeater 14 by well known signal processing methods. Such methods may be programmed in to the repeater's main controller. This method makes the signaling scheme fully compatible with existing DPL sensitive simplex radios since no additional or special radio decoding routine is necessary for unsquelching the audio path. In this method the quasi-duplex communication unit 18 determines hole timing information by detecting any one of the DPL words 70 and 72.

In a second method, one of the bits of a DPL word would be modified by replacing it with two alternating bits, thus creating a marker bit. This would occur every second word, and it would indicate how the coded squelch words are paired. The marker bit information enables an electronic duplex radio to look for synchronization to determine when the interruption is allowed. With the hole timing information the radio could begin its transmission a few milliseconds prior to the hole, so that the data will be transmitted at the instant the hole begins.

In order to insure detection reliability and to protect against missed bits particularly under low signal to noise conditions, a communication unit operating in accordance with the invention, would require some provisions to keep track of the DPL word pairs 52. Accordingly, a timer is kept upon detection of the first DPL word after a high speed exchange. The timer is updated upon subsequent detection of the DPL words. Furthermore, if the receiving radio does not have information on where the DPL words are, it can transmit one interruption request signal, listen for an acknowledgment, and if the acknowledgment is not received, an interruption is attempted on the next occurrence of a DPL word. The above provisions are implemented in the communication units by programming their central controllers for taking the above-described steps as is well known in the art.

Figure 4:
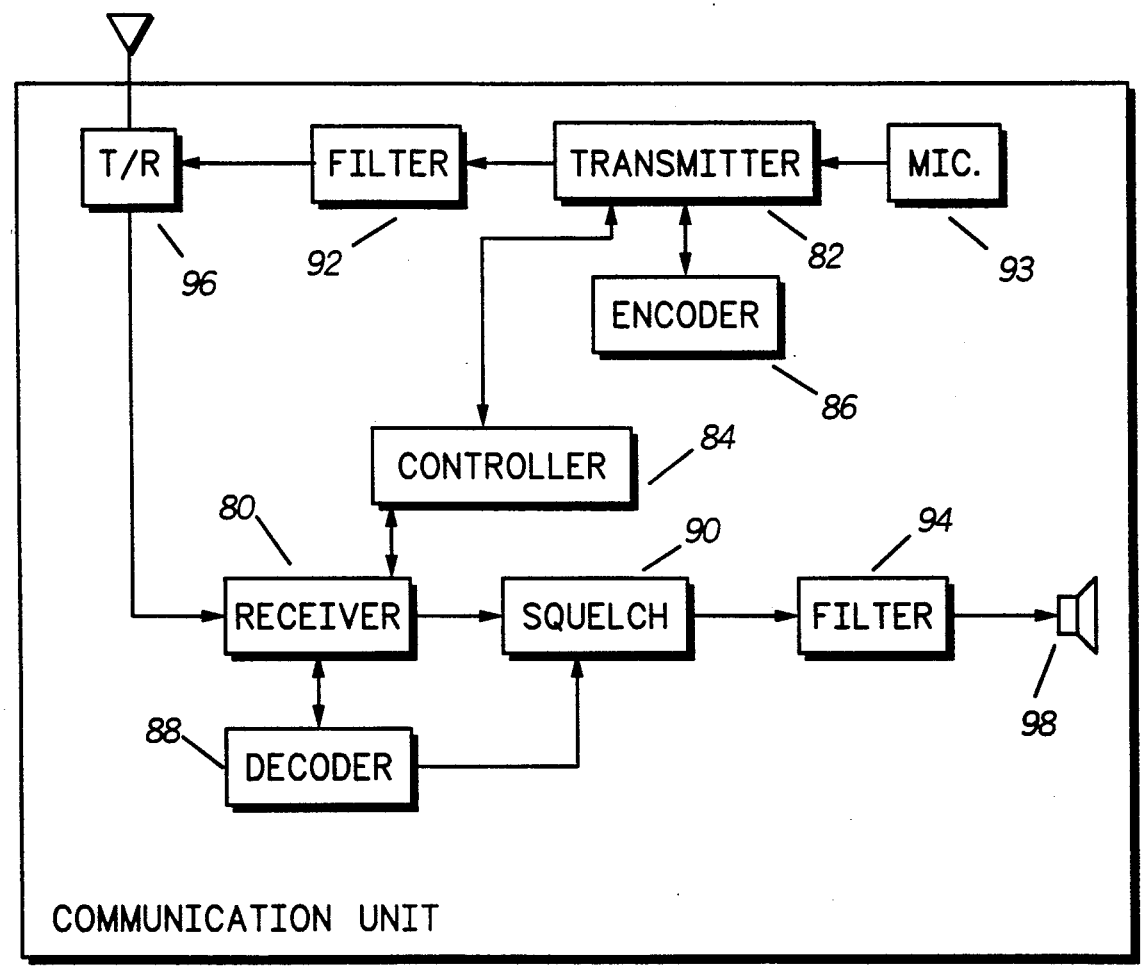
FIG. 4 shows a simplified block diagram of a communication unit that can operate in accordance with the invention.

Referring to FIG. 4, a simplified block diagram of a generic microprocessor controlled communication unit 400 is shown which may be configured as a quasi-duplex or a simplex communication unit. The communication unit 400 may operate as a quasi-duplex communication unit by programming the radio controller appropriately to take the required steps for achieving quasi-duplex communication. Alternatively, the communication unit 400 may be programmed to operate as simplex communication unit by taking steps for achieving simplex communication. The complexity of configuration as reflected by controller programming and the constituting elements determines whether the communication unit is simplex or quasi-duplex. The quasi-duplex communication units require more intensive signal processing than the simplex communication units. Therefore, they have more complex and advanced software and hardware requirements.

The communication unit 400 includes a receiver 80, a transmitter 82, and a controller (e.g., a conventional microprocessor) 84 for controlling the overall radio operation. The communication unit 400 further includes an encoder 86, coupled to the transmitter for generating the data to be transmitted. The data transmitted may comprise low-speed data or high speed data necessary for quasi-duplex communication. Alternatively, in simplex communication, such data may comprise DPL words necessary for simplex communication. The communication unit 400 includes a data decoder 88, coupled to the receiver 80, for decoding data signals that are received as necessary for each type of communication. The squelch 90 is coupled to the output of receiver 80. The transmit/receive switch 96 determines whether the radio is in a transmit or a receive mode.

Operationally, in quasi-duplex configuration, the controller 84 causes the transmitter 82 to place periodic holes in the transmission. The transmitter 82 modulates the audio signal from the microphone 93, and adds the encoded low speed words to the modulated signal. In simplex configuration the encoder adds appropriately coded DPL words to the transmission. A filter 92 conditions the output of the transmitter 82 for transmission. When the communication unit 400 is in the "receive" mode, the receiver 80 demodulates the received RF signal. In quasi-duplex configuration, the decoder 88 decodes the received low speed data to determine the hole timing. Whereas, in the simplex configuration, the decoder deactivates the squelch 90 when the appropriate DPL words are detected. A filter 94 filters the DPL words from the audio to be presented to a listener by a speaker 98. It may be appreciated that all the operational steps in communication units necessary for achieving the purpose of the invention are performed by the controller 84 which may be programmed utilizing well known techniques.

Figure 5:
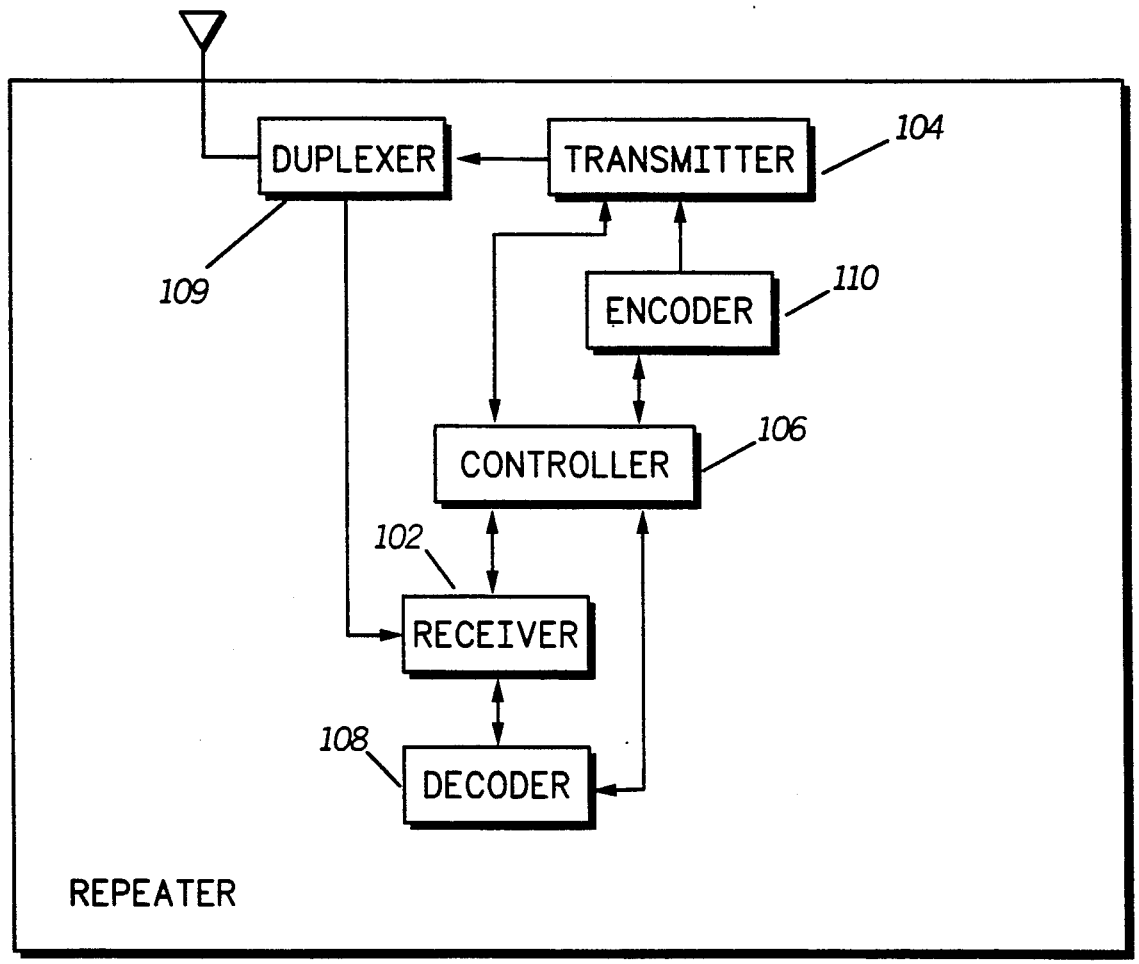
FIG. 5 shows a simplified block diagram of a repeater that can operate in accordance with the invention.

Referring to FIG. 5, a simplified block diagram of the repeater 14 is shown. The repeater 14 comprises a radio receiver 102, a radio transmitter 104, and a controller 106 for controlling the receiver 102 and the transmitter 104. The receiver 102 receives the first signal 12 (or the transmission signal 17), and transmits the second signal 16 to the communication units within the system 100. As previously discussed, the first signal 12 comprises a data portion, which, in turn, comprises data indicating the time at which at least one of the plurality of holes in the first signal 12 will occur. A decoder 108 decodes the data portion of the signal 12 received by the receiver 102 to determine the time at which at least one of the holes will occur in the first signal 12. Also decoded by the decoder 108 is the signal 17 and 20 to detect presence or absence of the transmitted DPL squelch signal and the DPL words. The transmitter 104, is coupled to the receiver 102 using a duplexer 109 so that it may transmit the second signal 16 representing the first signal 12. The second signal 16 comprises a plurality of digital coded squelch words as described above representing the locations of holes in the first signal. The encoder 110 is coupled to the transmitter 104 for producing the digital coded squelch signals 52.

Thus, the invention provides a synchronization means for quasi-duplex communication that allows users of simplex radios to listen to quasi-duplex transmissions, hence achieving compatibility between quasi-duplex and simplex communications systems.

What is claimed is:

1. In a communication system capable of providing communication between quasi-duplex communication units and simplex communication units through a repeater, a method comprising the steps of: in the quasi-duplex communication unit:
   (a) transmitting a first signal having a plurality of holes therein, the first signal comprising an audio-modulated portion, a data portion, the data portion including data indicating the time at which at least one of the plurality of holes will occur in the first signal; in the repeater:
   (b) receiving the first signal;
   (c) transmitting a second signal comprising:
      an audio-modulated signal representing the audio-modulated portion of the first signal; and
      a coded squelch signal synchronized with the holes in the first signal for providing hole timing information to other quasi-duplex communication units, said coded squelch signals being also capable of unsquelching the simplex communication units.

2. The method of claim 1, wherein the coded squelch signal comprises a digital coded signal.

3. The method of claim 2, wherein the coded squelch signal comprises at least one pair of digital private line signals being positioned immediately adjacent each other, wherein hole timing information is provided upon detection, by the quasi-duplex communication units, of one of the digital private line signals.

4. The method of claim 1, wherein said coded squelch signal has at least one marker for providing the hole timing information.

5. The method of claim 4, wherein said marker is positioned within a pair of digital private line signals.

6. The method of claim 5, wherein the marker comprises two alternating bits replacing a bit in one of the digital private line signals.

7. A communication device capable of communicating with a plurality of quasi-duplex communication units and a plurality of simplex communication units operating within a communication system, comprising:
   receiver means comprising means for receiving a first signal from the quasi-duplex communication unit, the first signal comprising a plurality of holes therein, and a data portion, the data portion comprising data indicating the time at which at least one of the plurality of holes will occur;
   decoder means for decoding the data portion received by the receiver means to determine the time at which at least one of the holes will occur in the signal having a plurality of holes;
   transmitter means coupled to the reciever means for transmitting a second signal representing the first signal, the second signal comprising a coded squelch signal synchronized with the plurality of holes in the first signal for providing hole timing information to other quasi-duplex communication units, the coded squelch signal being capable of unsquelching at least one of the simplex communication units; and
   encoder means, coupled to the transmitter means, for producing the coded squelch signal.

8. The communication device of claim 7, wherein the coded squelch signal comprises a digital coded signal.

9. The communication device of claim 8, wherein the coded squelch signal comprises at least one pair of digital private line signals being positioned immediately adjacent each other, wherein hole timing information is provided upon detection, by the quasi-duplex communication units, of one of the digital private line signals.

10. The communication device of claim 7, wherein said coded squelch signal has at least one marker for providing the hole timing information.

11. The communication device of claim 10, wherein said marker is positioned within a pair of digital private line signals.

12. The communication device of claim 10, wherein the marker comprises two alternating bits replacing a bit in one of the digital private line signals.

* * * * *